United States Patent [19]
Nelken

[11] 3,934,921
[45] Jan. 27, 1976

[54] BUFFER FOR SPRING-SUPPORTED WHEELS
[75] Inventor: Ewald Nelken, Mulheim, Germany
[73] Assignee: Fried. Krupp Huttenwerke AG, Bochum, Germany
[22] Filed: Sept. 21, 1973
[21] Appl. No.: 399,442

[30] Foreign Application Priority Data
May 12, 1973  Germany............................ 2324060

[52] U.S. Cl. ................................. 295/1; 46/243 E
[51] Int. Cl.² ........................................ B60B 17/00
[58] Field of Search................ 339/61 M, 3 R, 3 S; 29/628, 629; 295/1, 15, 25; 104/1 A; 174/84 S, 35 GC; 191/61, 63, 51, 60.5; 46/243 LV, 243 P, 243 E

[56] References Cited
FOREIGN PATENTS OR APPLICATIONS
1,044,145  11/1958  Germany ................................ 295/1

OTHER PUBLICATIONS

IBM Technical Disclosure Bulletin; "Hermetic Conductive Gaskets;" Vol. 14, No. 2 July 1971.

Primary Examiner—Trygve M. Blix
Assistant Examiner—Reinhard J. Eisenzopf
Attorney, Agent, or Firm—Holman & Stern

[57] ABSTRACT

A buffer for spring-supported wheels and a method of producing the buffer are disclosed. The buffer, which is of an elastic material, can be clamped into an annular slot formed by a wheel-rim and a wheel center-disk. The contact elements which provide the electrical connection include a contact plate which covers the rivet head and is retained in a recess in the buffer.

5 Claims, 4 Drawing Figures

BUFFER FOR SPRING-SUPPORTED WHEELS

BACKGROUND OF THE INVENTION

The present invention relates to a buffer of an elastic material, preferably rubber, which can be clamped into an annular slot formed between the shoulder of a wheel-disk and a wheel-rim of a rail-wheel for electrical vehicles. The opposite sides of the buffer which abut the wheel center-disk and the wheel-rim of said buffer, are connected with each other in recesses of the buffer element by means of contact elements for the purpose of providing an electrical connection from the wheel center-disk with the wheel-rim by means of a flexible conduit; each of the contact elements includes a contact-plate and a rivet head connected therewith, whereby the rivet head represents the ends of the conduit which are riveted together.

PRIOR ART

In prior art buffers of this general type, the ends of the flexible conduit are guided through boreholes in the contact plates, so that the rivet head rests from the outside on the contact plate. In so far as the buffer can be pressed into the annular slot without damaging the rivet head, an effective electrical connection between the wheel center-disk and the wheel-rim is produced. During the insertion of the buffer, there results, however, difficulties, which may easily result in damage to the rivet head so that the flexible conduit, during an operating cycle, slips out of the borehole in the contact plate and interrupts thereby the elctrical connection between the wheel-rim and the wheel center-disk. The mounting is made in a manner whereby the buffer elements are placed into the rivet which is limited by the shoulders of the wheel-rim and which are compressed to such an extent by a tapered socket cone through axial displacement so that they glide over the shoulder of the wheel center-disk into the rivet of the wheel-disk; this causes a shearing force on the surface of the buffer, which can shear off the soft rivet head.

OBJECTS AND SUMMARY OF THE INVENTION

It is the object of the present invention to provide a buffer of the above-mentioned type which can be easily mounted and which guarantees a permanent electrical connection between the wheel-disk and the wheel-rim. This problem is inventively solved in that the contact plate covers the rivet head and is retained by means of a clamp fit and/or a form fit in the recess of the buffer element.

During the mounting of the buffer of the present invention, the developing shearing forces will not shear off the soft material of the rivet head since it is covered by the contact plate. The surface area of the buffer, including the contact plate, can be smoothly constructed so that the buffer glides more easily over the cone than a buffer having an exposed rivet head.

The clamp fit and/or form fit of the contact plate in the recess retains the plate securely on the buffer element when the buffer is not mounted. Preferably, the conduit is made of stranded wire, particularly copper wire. This type of conduit can be riveted without difficulty by means of pressing.

According to a preferred embodiment, the recess opposite the channel in the buffer element through which the conduit is guided with a lateral play, is set in stages. At the shoulder of the recess, the rivet head can be formed from the end of the conduit by pressing.

According to the a further prefered embodiment, the complete volume of the channel in the buffer element is filled by the conduit preloaded by a static pressure. This feature ensures a good contact to the plates not only in the areas of the recesses but also in the area of the channel, because the compressed conduit in the area of the channel cannot fall back when the plates are placed in the recesses. It improves also the electrical contact between the plates and wheel. Additionally, the current-carrying capacity is improved because the complete sectional area of the channel is filled by the conduit.

The form fit of the contact plate, according to a further embodiment of the instant invention, can by obtained by forming the recess in a conical shape (converging) towards the surface area of the buffer element, with the contact plate having a form which is adapted to one of the forms of the recess.

In order to produce the best possible contact between the contact plate and the wheel-rim or the wheel center-disk, the surface area of the contact plate, compared with the surface area of the buffer element, may be elevated. For example, the surface area of the contact plate may be convex curved in an even surface area of the buffer element, and can be even when the surface area of the buffer element is of a concave shape.

A further object of the present invention is a method for producing a buffer of the above described type. This method includes steps in which each end of the flexible conduit, preferably copper wire, is pressed into a rivet head, onto which the contact plate is then placed, and is secured under pressure by means of force- or form-positive clamping of its edges to the inside of the recess. Preferably, the conduit in the channel is pressed before the ends in the recesses are pressed.

BRIEF DESCRIPTION OF THE DRAWINGS

The present invention is explained in more detail by the following description, taken in conjunction with the accompanying drawings illustrating two embodiments, wherein.

DESCRIPTION OF THE PREFERRED EMBODIMENTS

Figure 4:
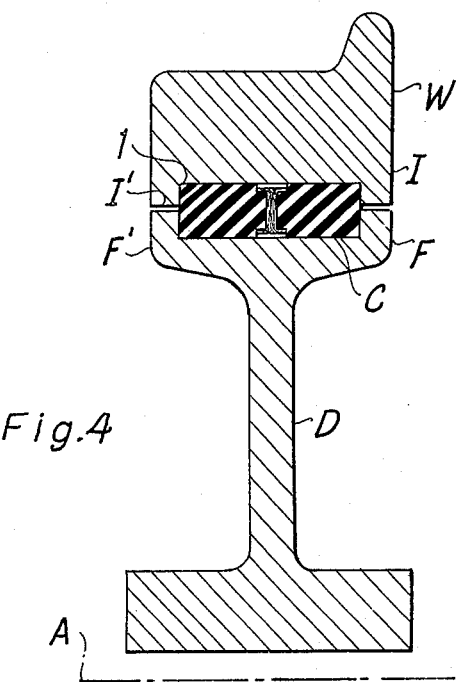
FIG. 4 is a partial, diametrical section, on a reduced scale, through a wheel generally showing how the buffers of FIGS. 1–3 are utilized.

Referring to FIG. 4, a wheel center disc D rotates about axis A, and the center disc D has opposed peripheral flanges F, F', flanking a peripheral channel C. Circumposed about the center disc D is a wheel W which includes inner flanges I, I', forming and flanking the channel C'. A buffer element 1 (other buffer elements being installed or disposed in a similar manner between the center disc D and wheel W) is installed in the confronting channels C, C' and when compressed in these channels provides an electrical circuit between the center disc D and wheel W.

Figure 1:
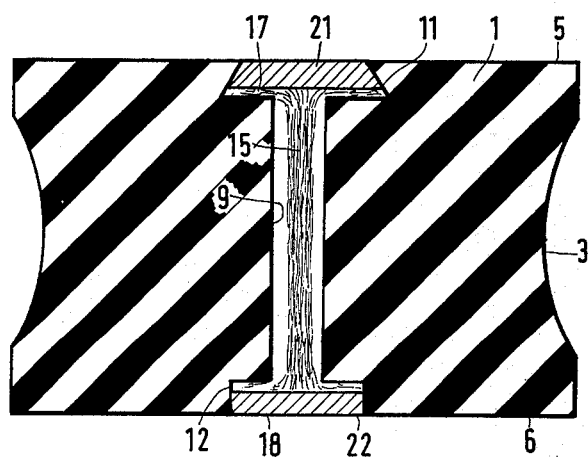
FIG. 1 shows an axial cross-section of the buffer.
Figure 2:
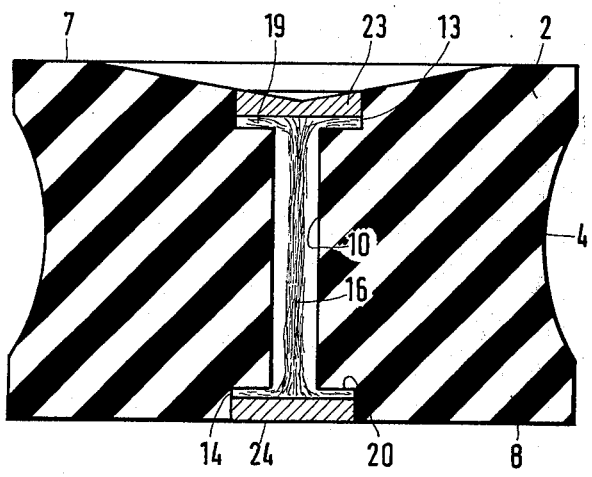
FIG. 2 shows an axial cross-section of an alternative embodiment of the buffer of the present invention.

Both exemplary embodiments of the buffer as shown in FIGS. 1 and 2 include symmetrical or, in cross-section, rectangularly shaped buffer element 1, 2, the sides of which are provided in cross-section with curved recesses 3, 4, respectively. The buffer element 1, 2, after being mounted, abut opposite areas of the wheel-rim and the wheel center-disk with its opposite sides 5, 6 or 7, 8, so that the buffers the developing radial forces of the wheel in the direction of its symmetrical axis.

The buffer element 1 or 2 is provided at its center with a coaxial channel 9 or 10, respectively, which in cross-section increases at its ends to recesses 11, 12 or 13, 14, respectively. A flexible conduit (conductor) 15 or 16 respectively, preferably of copper wire, runs with lateral play through the channel 9 and 10, respectively. The ends 17, 18 or 19, 20 of the respectively conduits 15, 16 are spliced open radially outwards and are pressed into a rivet head, over which is placed an electrical contact plate 21, 22, 23, 24, these contact plates 21, 22 or 23, 24 are fastened in the recess 11, 12 and 13, 14, respectively, by means of a clamp or press fit.

In the embodiment shown in FIG. 1, the upper recess 11 narrows or converges towards the side 5 and the contact plate 21 is provided with a corresponding form so that it is retained in this recess 11 by means of the form fit. The other contact plates 22 or 23, 24 are placed in the cylindrically-shaped recesses 12 or 13, 14 and are secured therein by means of clamp-fits. Both types of securing means for the contact plates 21, 22 or 23, 24 of the respective buffer elements 1 or 2 suffice to secure the same in their respective recesses 11, 12, 13, 14 before and during the mounting. During operation, the contact plates are unable to move out of their respective recesses 11, 12, 13, 14 due to the effects of the axial forces on the plate. In order to increase the contact pressure of the contact plates 21, 22, 23, 24 for improving contact between the wheel-rim W or the wheel center-disk D, their surface areas may be raised. For example, the surface area of the upper and lower contact plate 21, 22 of the embodiment shown in FIG. 1, and the surface area of the lower contact plate 24 of the embodiment shown in FIG. 2, may be conical in shape, while the contact plate 23 of the embodiment shown in FIG. 2, because of the concave form of side 7, may be of a corresponding shape.

The mounting of the rubber buffer is comparatively simple. After the production of the buffer element, which is provided with a channel 9, 10 and recesses 11, 12, 13, 14, the wire conduit 15, 16 is inserted into the channel 9, 10, in such a manner that its end 17, 18, 19, 20 protrudes from the channel 9, 10. The fibers are then radially pulled apart at the end of the wire-shaped conduit 15, 16.

These fibers are then pressed into a rivet head, whereby the shoulders of the recesses 11, 12, 13, 14 function as an abutment. The rivet head thus obtained covers the bottom of the recesses 11, 12, 13, 14. The contact plate 21, 22, 23, 24 is then pressed onto the flat rivet head by means of a clamp fit, and/or form-fit. Thus, one obtains an effective electrical connection between the conduit 15, 16 and contact plate 21, 22, 23, 24.

Since, in a mounted position, it is not recognizable if the buffer is provided with a conduit for producing the electrical connection of the wheel-rim with the wheel center-disk, the buffer can be identified in various ways. For example, a radial channel may originate from channel 9, 10, through which penetrates a conduit which is in connection with the conduit 15, 16, and which is guided outwards. This conduit may also serve as a connecting means for a buffer measurement between conduit 15, 16 and one of the contact plates 21, 22, 23, 24.

Since the contact plates 21, 22, 23, 24 have no bore holes and are secured in the recesses 11, 12, 13, 14 by means of a clamp fit, this arrangement is effective to a great extent in preventing moisture, which leads to corrosion, from entering the channel 9, 10.

Figure 3:
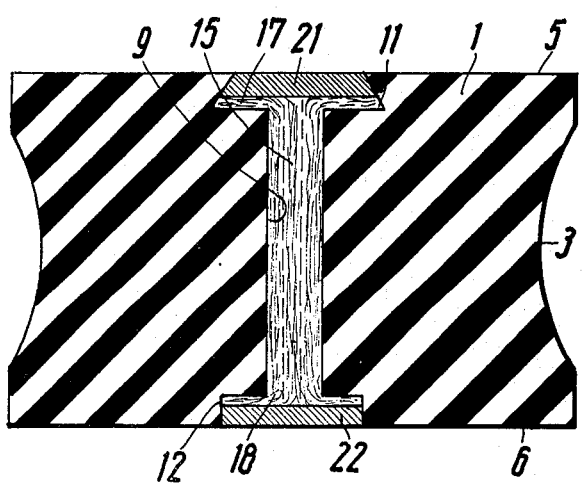
FIG. 3 shows an axial cross-section of the alternative embodiment of the buffer, the channel of which is completely filled by a pressed conduit.

Referring to FIG. 3, reference numerals similar to those used in FIG. 1 are applied, and these reference numerals identify the similar and previously described structure, however, in this embodiment the conduit or conductor 15' completely fills the channel 9.

It is claimed:

1. In a wheel for having an electrical current passing therethrough for use on an electrical vehicle, the wheel comprising a center-disc, a wheel-rim circumposed about said center-disc, said center-disc and wheel-rim including means forming an annular channel between the respective outer and inner peripheries of the center-disc and wheel-rim, elastic buffer means disposed between said center-disc and the wheel-rim and including electrical, current-conducting means for forming an electrical circuit between said center-disc and wheel-rim, the improvement in which the buffer means comprises a buffer element of an elastic material which is clamped at opposite sides in said annular channel, said annular channel being limited by portions of the center-disc and the wheel-rim, the opposite sides of the buffer element abutting respective portions of the center-disc and the wheel-rim and connecting the center-disc and wheel-rim to each other in cushioned relationship, said buffer element including a radially-extending channel extending through the opposite sides of the buffer element, a flexible electrical conductor extending through the radially-extending channel, said buffer element including opposed recesses in the opposite sides of the buffer element and communicating with the radially extending channel, electrical contact elements disposed in the opposed recesses of the buffer element, each contact element comprising a contact plate, the flexible electrical conductor terminating at opposite ends in a rivet head disposed beneath the contact plate in the opposed recesses and operatively connected to the contact plate, the rivet head being integral with the ends of the conductor, the contact plate covering the respective rivet head and being fixedly secured in a respective recess of the buffer element and protecting the rivet head from being sheared off while being compressed into contact with the center-disc and wheel-rim for insuring current transmittal.

2. The structure as claimed in claim 1 wherein the conductor is copper wire and the buffer is rubber.

3. The structure as claimed in claim 1 wherein said conductor extending between the opposite sides of said buffer element does not completely fill the radially-extending channel and has lateral play therein.

4. The structure as claimed in claim 1 in which the outer surface of at least one contact plate is at least coincident with the adjacent surface area of the buffer element.

5. The structure as claimed in claim 1 in which the electrical conductor disposed in said radially-extending channel is preloaded therein by a static pressure.

* * * * *